Sept. 18, 1962 W. J. GATZ 3,054,495
PUSHER APPARATUS FOR BREAD COOLERS AND THE LIKE
Filed Aug. 5, 1960 2 Sheets-Sheet 1

INVENTOR.
WILLIAM J. GATZ
BY
Harman, Harman, & McCulloch
ATTORNEYS

Sept. 18, 1962  W. J. GATZ  3,054,495

PUSHER APPARATUS FOR BREAD COOLERS AND THE LIKE

Filed Aug. 5, 1960 2 Sheets-Sheet 2

INVENTOR.
WILLIAM J. GATZ
BY
Harman, Harman, & McCulloch
ATTORNEYS

United States Patent Office 3,054,495
Patented Sept. 18, 1962

3,054,495
PUSHER APPARATUS FOR BREAD COOLERS
AND THE LIKE
William J. Gatz, Saginaw, Mich., assignor to Baker Perkins Inc., Saginaw, Mich., a corporation of New York
Filed Aug. 5, 1960, Ser. No. 47,794
5 Claims. (Cl. 198—24)

This invention relates to pusher apparatus for bread cooling or proofing systems and the like and more particularly to pusher mechanism which can be operated within a relatively limited space. Prior art pushers have generally been of the type disclosed in Temple Patent No. 2,823,811 and require a considerable amount of space within the proofer or cooler enclosure in front of the elevator run of the system. The pusher used in cooler or proofer installations may frequently require a stroke of about 51 inches and, accordingly, the crank arm or connecting rod, which is conventionally connected to the pusher, must travel in a circle having a diameter of at least 51 inches. Obviously, the area occupied by the operating parts, much of which might otherwise be used to extend the travel of the carriers, is not available in conventional coolers and proofers. Also, in many bakeries where space is limited, it simply is not possible to employ a conventional pusher. It is accordingly a principal object of the present invention to provide a pusher apparatus which requires a minimum of front-to-rear space and extends, for the most part, in a vertical direction within space which is already available inside the enclosure.

A further object of the invention is to provide pusher apparatus of the character mentioned which permits juxtaposed supply and discharge conveyors to be provided in the same general location within the enclosure in a manner to conserve space.

A further object of the invention is to provide pusher apparatus of the character described wherein the pusher apparatus moves relatively slowly into engagement with pans of bread or dough, as the case may be, thence more rapidly through most of its travel to transfer the pans to the trays, and finally decrease in speed at the end of its forward travel so that the pans are not subjected to jars or shocks which would tend to damage them and, in a case where they contain proofed dough, to collapse the proofed dough.

Still another object of the invention is to provide pusher apparatus which includes a flexible, reciprocable member which can flex to pass around obstacles and thus can utilize available space within an enclosure in an efficient manner.

A further object of the invention is to provide pusher apparatus of the type disclosed which does not require guide rails supported laterally at the sides of the cooler or proofer enclosure and a pusher bar which substantially spans the enclosure but rather can employ a more practical and less expensive pusher of restricted width.

Another object of the invention is to provide pusher apparatus of the type wherein guides provided for flexible link chain members can extend into the vertical path of descending trays having spaced apart support rods forming the bottoms of the trays with the tracks vertically positioned so that the rods of the trays pass freely past them.

A further object of the invention is to provide pusher apparatus of the character described which can be utilized with a continuously traveling tray conveyor system.

A still further object of the invention is to provide a pusher apparatus for cooler and proofer systems and the like which is considerably less expensive to manufacture and install, in addition to possessing the attributes which have been mentioned.

Briefly, the invention is concerned with a pusher head mounted longitudinally adjacent a support surface or conveyor which is situated longitudinally adjacent a run of the tray conveyor and includes a length of link chain connected to the pusher which is confined by a track so as to be capable of transmitting a lengthwise push, and means connected to the link chain for reciprocating the chain and moving the pusher forwardly and rearwardly.

Figure 1:
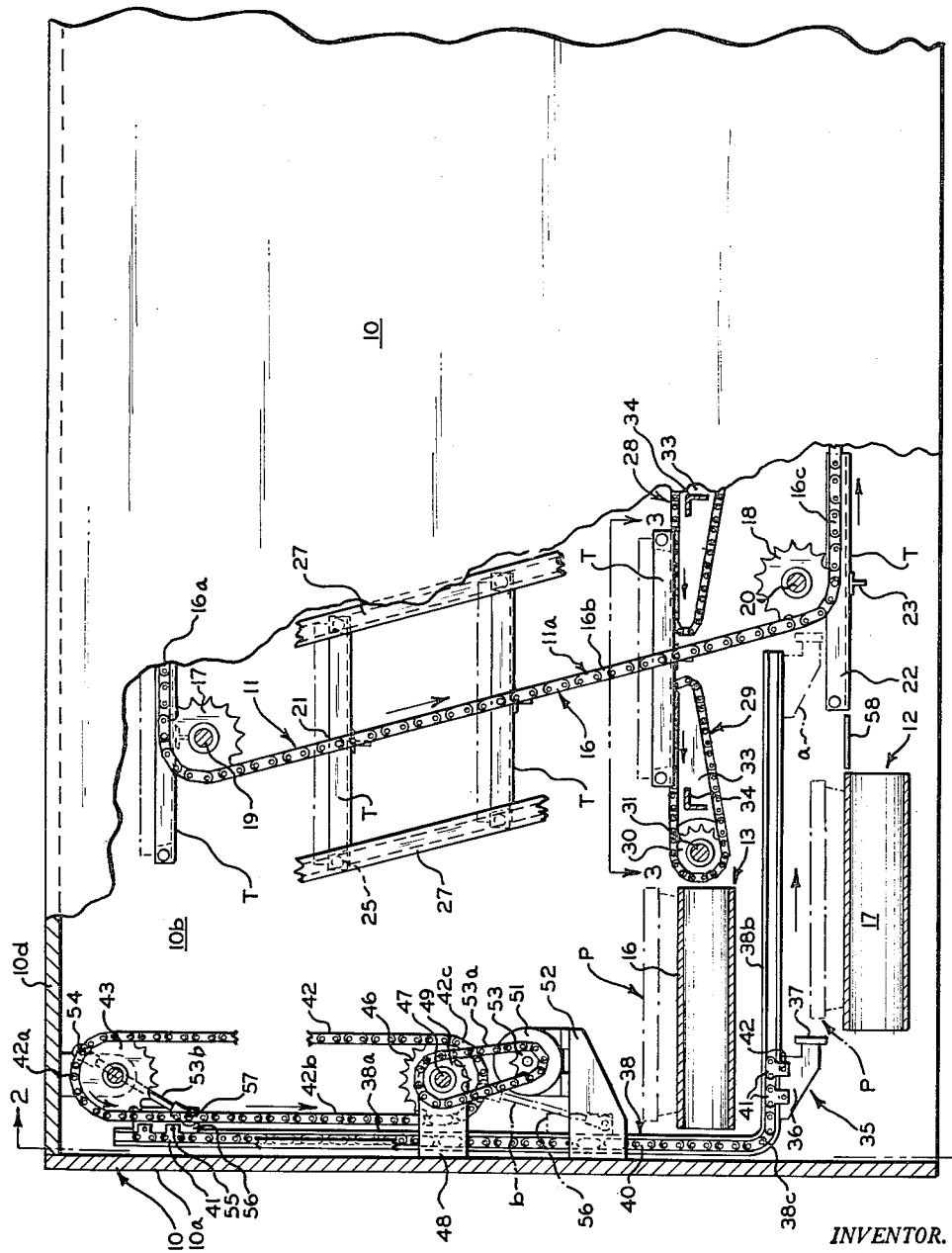
FIGURE 1 is a partly sectional, side elevational view of a bread cooler with diagrammatic lines showing pans on the supply and discharge conveyors, and the trays of the conveyor system, and also indicating advanced positions of certain elements of the pusher mechanism.

Referring now more particularly to the accompanying drawings, wherein I have shown a preferred embodiment of the invention, a numeral 10 generally indicates an enclosure which for purposes of illustration will be assumed to be a cooler enclosure having a front wall 10a, side walls 10b and 10c, a roof 10d, and a rear wall 10e. Supported within the enclosure 10 is an endless tray conveyor of conventional design, generally indicated by the numeral 11, which receives pan sets P containing bread from a supply conveyor generally designated 12 and conveys them to the rear end of the enclosure 10 and thence back to the front end once again for discharge to a discharge conveyor generally identified by the numeral 13. The superposed supply and discharge conveyors 12 and 13, which extend transversely into the enclosure 10 through openings 14 and 15 in the side wall 10b, may be of the endless type and, as disclosed for purposes of illustration, include endless belts B and end rollers R. Suitable drive motors (not shown) may be used to drive the conveyors 12 and 13 through a gear reduction system at predetermined rates of speed to correlate their travel with the speed of travel of the endless tray conveyor system 11. Also, in accordance with the speed of the conveyor tray system 11, the pan sets P will be delivered from the oven to the cooler enclosure 10 in a predetermined, spaced apart relation.

As disclosed, the tray conveyor system 11 includes a pair of laterally spaced, endless chain members 16 which have upper longitudinal run portions 16a, generally vertical front run portions 16b, and lower generally longitudinal run portions 16c. The link chains 16 pass around upper sprockets 17 and lower sprockets 18 mounted on shafts 19 and 20, respectively, and it is to be understood that similar upper and lower sprocket members 17 and 18 on shafts 19 and 20 are provided at the rear end of the enclosure in the usual manner.

Figure 3:
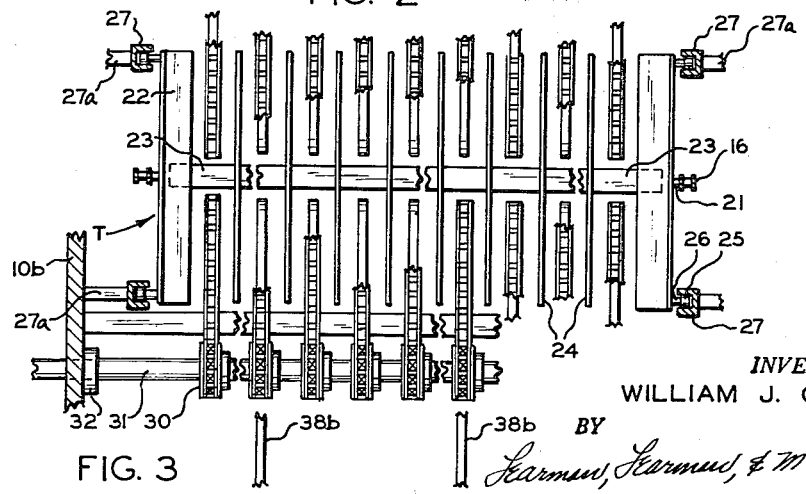
FIGURE 3 is a fragmentary, top plan view illustrating the manner in which the spaced apart article support rods of the trays pass by the discharge conveyors and the pusher chain guidetracks when the trays move downwardly on the vertical run of the tray conveyor system.

Trays T are supported for movement around the circuit between the chains 16 by means of pins 21 which connect to certain links of the chains 16 and it will be seen that the trays T are of the conventional type and comprise side angle plates 22 connected by a bottom T-bar 23 to which are welded spaced apart rods 24 which form the support surface of the trays T. Each of the trays T may carry rollers 25 on pins 26 which guide in the longitudinal and generally vertically extending tracks which are provided around the circuit to maintain the trays T level at all times. In FIGURES 1 and 3 the usual generally vertical channel tracks 27 are shown and the rollers 25 of the trays T of course guide within the tracks 27 as the trays T descend at the front end of the enclosure 10. Similar guides 27 are, of course, employed at the rear end of the enclosure 10 and longitudinally extending guides (not shown) are also provided adjacent the upper and lower runs 16a and 16b of the conveyor chains 16. The guide tracks 27 are supported from the side walls of the enclosure 10 by brackets 27a or the like. The tray conveyor system 11 which has been described is conventional and requires no further description. A suitable drive motor is connected to one of the shafts 19 or 20 to drive the tray conveyor 11 continuously at a predetermined rate of speed through a suitable gear reduction system.

The discharge of the pan sets P from the trays T after they have completed a circuit through the enclosure 10 is conveniently accomplished by endless chain conveyors in transversely spaced apart relation inwardly of the tray conveyor runs 16b, which are generally identified by the numeral 28, and an identical set of endless chain conveyors forwardly of the tray conveyor chain runs 16b, each of which is generally identified by the numeral 29. As will be seen from an inspection of FIGURE 3, the conveyors 28 and 29 are transversely or laterally spaced in the enclosure 10 in such position that the rods 24 of the conveyor trays T pass between them and deposit the pan sets P thereon in their downward travel on the front runs 16b. In construction, the conveyors 28 and 29 may be identical and comprise sprocket members 30 mounted on drive shafts 31 journaled by bearings 32 (FIGURE 3) in the side walls 10b and 10c of the cooler enclosure 10, and elongate support plates 33 which are supported by cross beams 34 also from the sides 10b and 10c of the enclosure 10.

A pusher means generally identified by the numeral 35 is, in inoperative position, normally situated at the front side of the supply conveyor 12 and comprises side plates 36 connected by a pusher bar 37. Connected to the side plates 36 is a system which obviously requires only a minimum front-to-rear space within the enclosure to move the pusher bar 37 across the conveyor 12 and over to the diagrammatic line position indicated by "a" and which very efficiently utilizes available vertical space within the enclosure 10.

Figure 2:
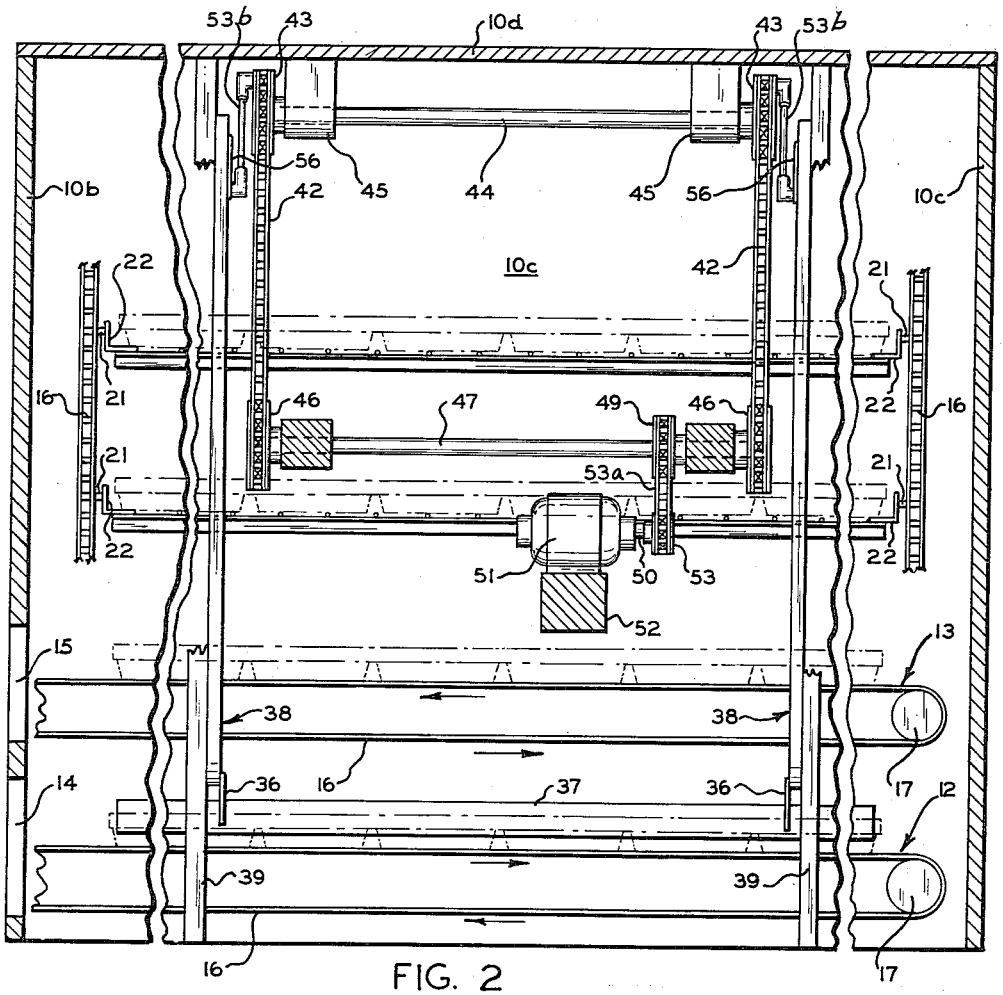
FIGURE 2 is a transverse, sectional view on an enlarged scale taken on the line 2—2 of FIGURE 1, certain elements of the pan discharge apparatus being omitted in the interests of clarity.

Pairs of angular channel track members generally indicated at 38 are supported by uprights 39 (FIGURE 2) from the floor of the enclosure 10 and each slidably receives a length of conventional link chain 40 such as disclosed in Patent No. 2,390,455 in a manner to permit reciprocation of the chains 40 in the tracks 38 while restricting the links of the chain from buckling. The endmost links 41 at one end of the chain have extensions which permit them to be connected by means of pins 42 to the pusher side members 36 and similar links 41 are provided at other locations to permit attachment of the chain to a drive system in a manner to be disclosed. It will be seen that the tracks 38 have vertical portions 38a and longitudinally extending portions 38b extending above the supply conveyor 12 which are connected to the portions 38a by means of curvilinear corner portions 38c. As FIGURE 3 indicates, the portions 38b are aligned with certain of the conveyors 29 so that they extend between the rods 24 of trays T and do not interfere with the descent of the rays T.

The drive mechanism for the chains 40 is of a particular design to move the link chains 40 at a slower rate of speed at the beginning and end of their travel inwardly than during the intermediate portion of their travel and comprises endless chains 42 trained around sprockets 43 mounted by a shaft 44 which is supported from the roof 10d of the enclosure 10 by bearings 45. The chain conveyors 42 at their lower ends extend around sprockets 46 which are fixed on the drive shaft 47 supported by bearings 48 from the front wall 10a of the enclosure 10. A drive sprocket 49 on the shaft 47 is connected with the armature shaft 50 of a motor 51 by a chain 53a which is trained around a sprocket 53 fixed on the armature shaft 50. The motor 51 can be supported outside the enclosure 10 or inside on a platform 52 in the manner shown.

Connecting links 53b pivoted to selected links of the chains 42 by pins 54 connect the chains 42 with the length of chain 40. At the upper end of chain 40 links 41 are connected by pins 55 to blocks 56 and the connecting links 53b are pivotally connected to blocks 56 by pins 57.

In operation, the trays T move continuously in a counterclockwise direction in the enclosure 10 on the chains 16. As they pass the conveyors 28 and 29 they deposit the pan sets P which they are carrying thereon and these pan sets are discharged by the conveyors 28 and 29 to the discharge conveyor 13. Thus when the trays T reach the lower position illustrated by the lowermost tray T in FIGURE 1, and commence to move longitudinally, they are empty. The chains 42 may be intermittently operated or continuously operated in timed relation with the travel of the trays T. It is only necessary that the travel of the chains 40 be fast enough so that the pusher bar 37 moves the pan sets P from the supply conveyor 17 across the bridge plate 58 at a speed which overtakes the relatively slowly moving trays T on the longitudinal runs 16c and deposits the pan sets P thereon.

The innermost position of the pusher apparatus 35 is indicated by the letter "a." As the links 53b shown in FIGURE 1 move counterclockwisely, the travel of chains 40 is at first slower until the bar 37 comes into engagement with the pan set P which is in position on the supply conveyor 17 and thence is speeded up as the links 53b move on the vertical runs 42b. Substantially the lowermost position of the rods 53b is indicated by the diagrammatic lines "b" in FIGURE 1 and, of course, as the rods 53b travel around the lower curvilinear runs 42c of the chains 42, the rods 53b move upwardly and the chains 40 pull the pusher bar 37 forwardly to the retracted position in which it is shown in solid lines in FIGURE 1. By the time the pusher bars 37 have been restored, the next tray T has reached substantially the limit of its descent on the runs 16b of the chains 16 and the pusher bar 37 is ready to move inwardly once again. By this time, also, a new pan set P has been delivered by the supply conveyor 17 to a position opposite the lowermost tray T.

It should be clear that I have perfected a very simple and practical pusher apparatus which is well adapted to the cooler system disclosed and also well adapted to use in proofer systems and the like.

It is to be understood that the drawings and descriptive matters are in all cases to be interpreted as merely illustrative of the principles of the invention rather than as limiting the same in any way since it is contemplated that various changes may be made in the various elements to achieve like results without departing from the spirit of the invention or the scope of the appended claims.

I claim:

1. In a conveyor system including product carrying trays which travel continuously along a vertical conveyor run and thence generally longitudinally along a generally longitudinal run; an article support surface longitudinally adjacent said generally longitudinal run; and pusher means on the side of said support surface remote from said generally longitudinal run operative to travel across said surface and push articles from said surface to one of said trays.

2. In a conveyor system including spaced apart product carrying trays which are adapted to move along a vertical conveyor run; an article support surface adjacent said run; a pusher on the side of said support surface remote from said run; flexible means leading from said pusher and connected thereto; guide means having a portion extending longitudinally and a portion extending generally vertically closely confining and rendering said flexible means inflexible to the extent it has lengthwise rigidity and can be pushed to move said pusher in a path across said article support surface to move articles from said support surface to one of the trays; and means remote from said longitudinally extending portion connected to said flexible means for exerting a lengthwise push thereon.

3. In a conveyor system including spaced apart product carrying surfaces which are adapted to move along a vertical conveyor run; an article support surface adjacent said run; a pusher on the side of said article support surface remote from said run; a length of link chain leading to said pusher and connected thereto; a track including a generally vertical portion, a curvilinear corner portion, and a portion extending longitudinally above and across said support surface closely confining and rendering said chain inflexible to the extent it has lengthwise rigidity and can be pushed to move said pusher in a path across said article support surface to move articles from said support surface to one of the trays; and means adjacent said vertical portion connected to said flexible means at a point remote from said longitudinal track portion in all positions of said pusher for exerting a lengthwise push thereon.

4. In a conveyor system including spaced apart product carrying trays which are adapted to move along a vertical conveyor run; an article support surface adjacent said run; a pusher on the side of said support surface remote from said run; a length of link chain extending to said pusher and connected thereto for travel in a reciprocatory path; track means having a generally vertical portion, a longitudinal portion, and a connecting curved portion, all closely laterally confining said chain and rendering it inflexible to the extent it has lengthwise rigidity and can be pushed to move said pusher in a path across said article support surface to move articles from said support surface to one of the trays; an endless drive member extending generally vertically alongside said generally vertical portion of the track means; and connecting rod means pivotally connected to said endless drive member and chain for exerting a lengthwise push and pull on said chain and causing it to travel at varying speeds during different portions of its reciprocatory travel.

5. In a conveyor system including product carrying trays which travel continuously along an endless conveyor having a vertical conveyor run and thence generally longitudinally along a generally longitudinal run; an article support surface longitudinally adjacent said generally longitudinal run; a pusher on the side of said support surface remote from said generally longitudinal run; a length of link chain connected with said pusher; a track including a generally longitudinally extending portion adjacent said support surface and a portion leading angularly therefrom within which said link chain is closely confined so that it cannot buckle, said track being of substantially the width of the chain to prevent buckling thereof when a push is applied to said chain in a lengthwise direction; and means connected with said chain in said angular track portion remote from the longitudinal track portion for pushing and withdrawing it to move said pusher across said surface and push articles from said surface to one of said trays, and return.

References Cited in the file of this patent
UNITED STATES PATENTS

| | | |
|---|---|---|
| 980,181 | Asbury | Jan. 3, 1911 |
| 2,823,811 | Temple | Feb. 18, 1958 |